United States Patent [19]

Kawaguchi et al.

[11] 4,256,396
[45] Mar. 17, 1981

[54] CAMERA VIEWFINDER DEVICE

[75] Inventors: Taizo Kawaguchi, Amagasaki; Haruo Kobayashi, Toyokawa, both of Japan

[73] Assignee: Minolta Camera Kabushiki Kaisha, Osaka, Japan

[21] Appl. No.: 952,232

[22] Filed: Oct. 17, 1978

[30] Foreign Application Priority Data

Oct. 19, 1977 [JP] Japan .................. 52-140911[U]

[51] Int. Cl.³ .................. G03B 13/10; G02B 15/02
[52] U.S. Cl. .................. 354/222; 350/422
[58] Field of Search .................. 354/197, 199, 222; 352/93, 142; 350/183, 37–39; 355/55

[56] References Cited

U.S. PATENT DOCUMENTS

| | | | |
|---|---|---|---|
| 2,900,887 | 8/1959 | Nerwin | 354/199 X |
| 2,906,172 | 9/1959 | Klemt | 350/183 |
| 2,917,969 | 12/1959 | Tatuo Nojiri | 354/222 |
| 3,665,834 | 5/1972 | Loewe | 354/197 X |
| 3,890,626 | 6/1975 | Ettischer | 354/197 |
| 4,038,673 | 7/1977 | Schoder | 354/222 |
| 4,104,663 | 8/1978 | Yamazaki et al. | 354/197 |

*Primary Examiner*—Joseph W. Hartary
*Assistant Examiner*—Thomas H. Tarcza
*Attorney, Agent, or Firm*—Wolder, Gross & Yavner

[57] ABSTRACT

A camera having at least two objective lenses of different focal lengths, which can be selectively externally manually positioned in the camera photographic optical path includes an inverted Galilean viewfinder optical system consisting of a front negative, divergent lens group and a rear positive, convergent lens group. The divergent lens group consists of two concave lenses which are transferrable between a first position providing a low magnification and a second position providing a high magnification. In the first position both concave lenses are in the viewfinder optical path and the other concave lens remains in the viewfinder optical path and is shifted to a second position axially spaced from its first position along the finder optical axis.

12 Claims, 10 Drawing Figures

CAMERA VIEWFINDER DEVICE

BACKGROUND OF THE INVENTION

The present invention relates to improvements in viewfinder devices for use in cameras and it relates more particularly to an improved viewfinder which is alternatively transferable between a first condition for low magnification and a second condition for high magnification.

In a camera constructed to change the focal length of the photographic optical system by bringing selected lenses built in a camera body in or out of the photographic optical path, i.e., a camera in which a plurality of photographic lenses of different focal lengths are selectively or alternatively brought in the photographic optical path, the viewing angle of magnification of the viewfinder device must be changed in response to changes in focal length.

Mechanism for changing the viewing angle of magnification of the viewfinder are known in the prior art, and a typical type is such that the concave lenses in an inverted Galilean finder are axially moved along the viewfinder optical axis in response to the transfer or movement of one of the lenses in the photographic optical path (hereinafter referred to as the focal length changeover operation). Another type of mechanism is constructed such that in response to the focal length changeover operation two concave lenses are alternatively inserted in the viewfinder optical path.

The former type of variable viewfinder is described in U.S. Pat. No. 3,890,626, issued on June 17, 1975 and includes a mechanism which changes the magnification of the viewfinder by the movement of the concave lens along the viewfinder optical axis, thereby continuously varying the magnification during the focal length changeover operation. This influences a photographer who is not accustomed to the camera to wrongly think that a variable focus lens or so called zoom lens is mounted in the camera since the magnification of the viewfinder gradually changes, leading to photography initiation before the lenses are completedly inserted in or retracted from the photographic optical path, the mechanism thus possessing an important disadvantage.

A variable viewfinder of the latter type is described in U.S. Pat. No. 4,038,673 issued on July 26, 1977 and includes a mechanism in which the magnification of the viewfinder is transferred alternatively to a first low magnification condition or to a second high magnification condition in response to the focal length changeover operation, the mechanism thus eliminating the disadvantages of the former type viewfinder. However, in the mechanism described in U.S. Pat. No. 4,038,673 the number of lenses constituting the viewfinder optical system is the same in the first and second conditions, thus necessitating that the surface curvatures of the concave lens inserted in the viewfinder optical path upon the viewfinder being set in the first condition for low magnification be relatively large. As a result, aberrations in the first condition of low magnification are high, the mechanism thus having the drawback that the view through the finder is of poor quality and low resolution.

SUMMARY OF THE INVENTION

It is a principal object of the present invention to provide an improved camera viewfinder device.

Another object of the present invention is to provide an improved camera viewfinder device of variable magnification or angle of view.

Still another object of the present invention is to provide an improved camera viewfinder which is transferrable alternatively to a high or low magnification condition.

A further object of the present invention is to provide an improved variable magnification viewfinder device of the above nature characterized by its low aberration, particularly at low magnification, reliability, simplicity, convenience and versatility.

The above and other objects of the present invention will become apparent from a reading of the following description taken in conjunction with the accompanying drawings which illustrate preferred embodiments thereof.

In a sense the present invention contemplates the provision of an improved camera viewfinder which comprises at least one positive lens located in the viewfinder optical axis, a pair of first and second negative lenses and means for transferring said negative lenses alternatively to a first condition with said first and second negative lenses on said optical axis and a second condition with said first lens retracted from said optical axis and said second lens on said optical axis and axially displaced from its position in said first condition.

In accordance with the preferred embodiments of the present invention, the associated camera is provided with a pair of objective lenses which are alternatively positioned on the camera optical axis and means are provided for transferring the negative lenses between their first and second conditions in response to the positioning of the selected objective lens on the camera optical axis. Advantageously, the first negative lens is swingable into and out of the viewfinder optical axis and means are provided for axially shifting the second negative lens with the swinging of the first negative lens.

The improved viewfinder overcomes the drawbacks of the earlier types of variable magnification viewfinders, being transferrable to alternative high and low magnification conditions and having low aberration under both conditions.

DESCRIPTION OF THE PREFERRED EMBODIMENTS

Figure 1:
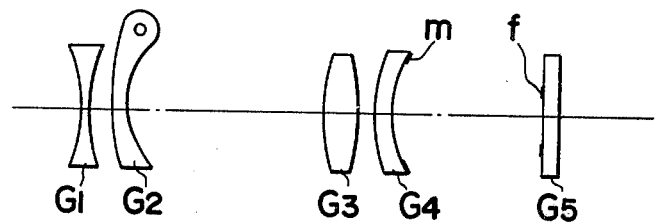
FIG. 1 is a diagrammatic view of the optical system in accordance with a first embodiment of the present invention illustrated in a low magnification condition.

Referring now to the drawings, particularly FIGS. 1 to 6 thereof which illustrate a preferred embodiment of the present invention, the improved viewfinder lens system includes four successive lenses, a negative divergent front first lens G1, a negative divergent second lens G2, a positive convergent third lens G3 and a convex concave rear fourth lens G4, the lenses constituting an inverted Galilean finder.

Lenses G1 and G2 located in the front constitute an objective divergent lens group, and lenses G3 and G4 in the rear, an ocular convergent lens group. Provided on the concave surface of the concave lens G4 is a reflecting frame m for reflecting an image of a limiting frame f upon an eyepiece G5, thereby constituting a known albada finder.

Figure 2:
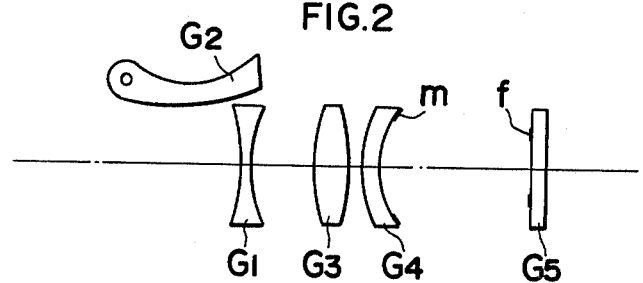
FIG. 2 is a view similar to FIG. 1, but in a high magnification condition.

The viewfinder optical system is constructed such that it may be transferred by a mechanism hereinafter described alternatively to a first condition providing a low magnification and a second condition providing a high magnification. In the low magnification first condition lenses G1, G2, G3 and G4 which are contained in a camera body are all positioned in the viewfinder optical path, thus defining a 4 group 4 element optical system, as shown in FIG. 1. In the high magnification second condition the objective concave first lens G1 is shifted along the optical axis towards eyepiece G5, and second lens G2 is retracted out of the viewfinder optical path, as shown in FIG. 2, thereby defining a 3 group 3 optical system comprising lenses G1, G3 and G4.

Figure 3:
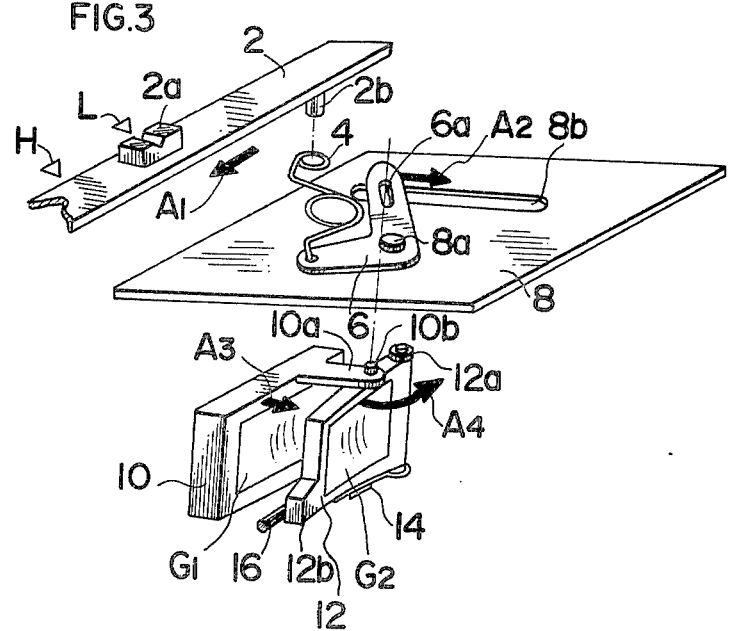
FIG. 3 is an enlarged exploded perspective view of the viewfinder magnification changeover mechanism illustrated in a low magnification condition.
Figure 4:
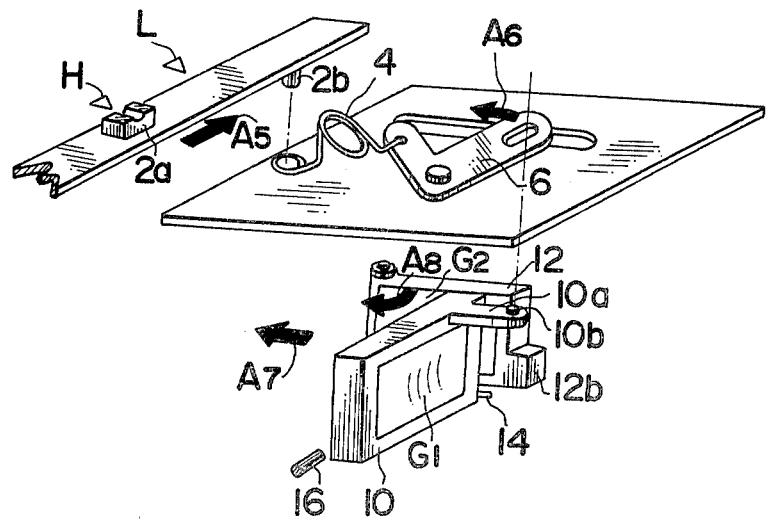
FIG. 4 is a view similar to FIG. 3 but illustrated in a high magnification condition.

The transfer mechanism for changing the magnification condition from a low to high magnification or vice-versa is constructed as shown in FIGS. 3 and 4 in which FIG. 3 illustrates the transfer mechanism and the positions of lenses G1 and G2 in the low magnification first condition. A changeover knob 2a for externally manipulating lenses G1 and G2 inside the camera body is fixed on the top surface of an operating plate 2. On the bottom surface of operating plate 2 is provided a depending stud 2b which is coupled to one end of a torsion spring 4 whose other end is secured to one end of an substantially L-shaped lens changeover lever 6. Lens changeover lever 6 is rotatably mounted by a pivot 8a on a fixed base plate 8. Lenses G1 and G2 are advantageously formed of synthetic resin material integrally with frames 10 and 12 respectively. A tongue 10a is provided on frame 10 and extends beyond frame 12 of lens G2 located rearwardly of lens G1, and the free end of tongue 10a carries an upwardly projecting pin 10b. Formed in the other end of changeover lever 6 is a longitudinal slot 6a, which is slidably engaged by a pin 10b which also slidably engages a slot 8b formed in fixed plate 8. Slot 8b in fixed plate 8 guides pin 10b of frame 10 to move in a linear path parallel to the viewfinder optical axis. Therefore, when lens changeover lever 6 is rotated, lens G1 is moved by pin 10b along the viewfinder optical axis. Frame 12 is provided at a corner with a vertical pivot 12a located out of the viewfinder optical path and vertically to the viewfinder optical axis, frame 12 being urged or biased by a spring 14 to swing in a clockwise direction. When frame 12 is in the viewfinder optical path, it is maintained in a plane vertical to the viewfinder optical axis by the engagement of an end 12b of frame 12 with a stop pin 16 positioned out of the viewfinder optical path. When lens G1 is rearwardly axially shifted together with frame 10, the lens G2 is rotated about pivot 12a in a counter-clockwise direction, and is displaced or retracted out of the viewfinder optical path by the frame 10. The lens G2 is maintained by frame 10 of lens G1 in its retracted position to which lens G2 has been retracted.

Considering now the operation of the transfer mechanism when the viewfinder optical system is changed from the first low magnification condition to the second high magnification condition the following occurs. When the knob 2a of operating plate 2 is moved from a suitably positioned index L to an index H, i.e. when moved in the direction of an arrow A1, lens changeover lever 6 is first urged by torsion spring 4 in a counter-clockwise direction. However, pin 10b of frame 10 engaged by one end of lens changeover lever 6 comes into contact with the front end of slot 8b of fixed plate 8, thus stopping the rotation of lens changeover lever 6 in the counter-clockwise direction. Torsion spring 4 is charged to increase in loading or repulsion force as operating plate 2 is shifted or slid, and when operating plate 2 passes through a given position or equilibrium point, torsion spring 4 suddenly changes its acting direction to rotate lens changeover lever 6 in clockwise direction. As a result, lens changeover lever 6 is pushed by torsion spring 4 thus charged and is forced to rotate in the direction of the arrow A2, thereby moving lens G1 backwards in the direction of arrow A3. Frame 10 of lens G1 comes into contact with the front of frame 12 of lens G2 located rearwardly of lens G1, frame 10 thus rotating lens G2 and frame 12 against the force of spring 14 in the counter-clockwise direction shown by arrow A4 about pivot 12a, and pushing lens G2 and frame 12 out of the viewfinder optical path. This causes the transfer mechanism and lenses G1 and G2 to assume the high magnification second condition, as shown in FIG. 4, the viewfinder optical system thus being changed to a 3 group 3 element system, as shown in FIG. 2.

When changing from the high magnification second condition to the low magnification first condition for the transfer mechanism functions in the reverse order of that described above. That is, in FIG. 4, when knob 2a is moved from H to L, i.e. operating plate 2 is moved in the direction of the arrow A5, lens changeover lever 6 is rotated by torsion spring 4 in the direction of arrow A6 causing lens G1 to be moved forward in the direction of A7. Lens G2 follows the forward movement of frame 10 of lens G1, and is rotated by spring 14 in the direction of the arrow A8 to return to the viewfinder optical path, and end 12b of frame 12 engages with stop pin 16, lens G2 thus being maintained in a plane vertical to the viewfinder optical axis.

Figure 5:
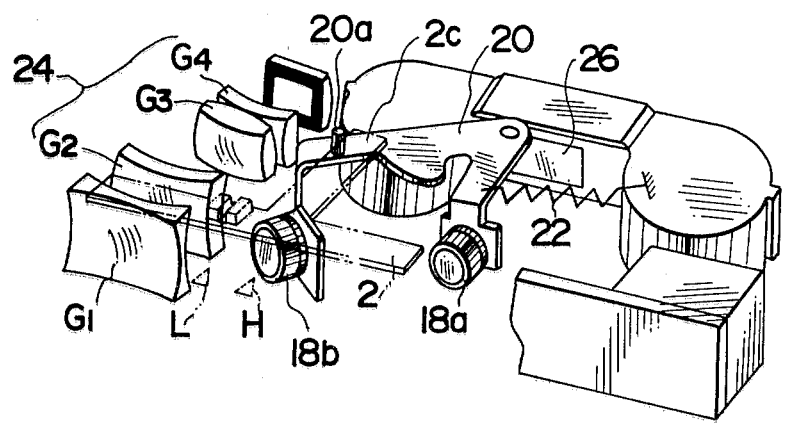
FIG. 5 is a fragmentary perspective view of parts of a camera associated with the viewfinder and having alternatively operative different focal length objective lenses, showing the viewfinder objective lens transfer coupling mechanism and illustrated with a short focal length objective lens in operative condition.
Figure 6:
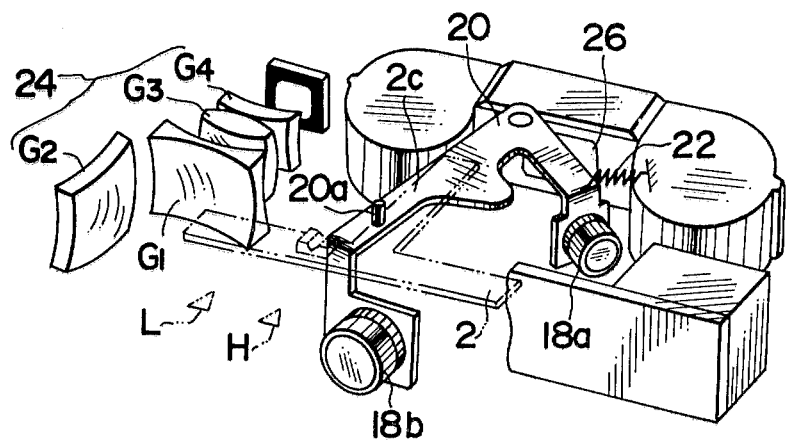
FIG. 6 is a view similar to FIG. 5, but with the long focal length objective lens in operative condition.

Referring to FIGS. 5 and 6 which show the above embodiment as applied to a small sized camera of the type using size 110 films manufactured by Eastman Kodak Company, the operating plate 2 described above for transferring the viewfinder optical system interlocks with the changeover mechanism of the camera multiple photographic or objective lens. A V-shaped support frame 20 carries two types of photographic or objective lenses 18a and 18b of different focal lengths mounted on the free ends of both its arms, support frame 20 being rotatably pivoted about its elbow and urged by a spring 22 in a counter-clockwise rotation. Provided at one end of holding frame 20 is a pin 20a which always engages the left hand edge of an arm 2c projecting from operating plate 2, thereby limiting the rotation of holding frame 20 in a counter-clockwise direction.

It should be noted that operating plate 2 and lenses G1 and G2 are interlocked with each other, as shown in FIGS. 3 and 4, though omitted in FIGS. 5 and 6 in order to simplify the drawings. When shifting the operating plate 2 to be set to index L, objective lens 18a of short focal length is positioned in the operative location as a photographing lens in the camera photographic optical path, as shown in FIG. 5, and the viewfinder 24 is transferred to the low magnification first condition, as shown in FIGS. 1 and 3. When shifting operating plate 2 to be set to index H, photographic lens 18b of long focal length is positioned in the operative location in the camera photographic optical path, as shown in FIG. 6 and viewfinder 24 is also transferred to the high magnification second condition shown in FIGS. 2 and 4. Thus, in response to the transfer of long focal length lens 18b and short focal length lens 18a alternatively to an operative position in the camera photographic optical path, the viewfinder is automatically transferred to either its first or second condition for low or high magnification respectively, so that the viewfinder observed image corresponds to the objective lens film projected image.

Figure 7:
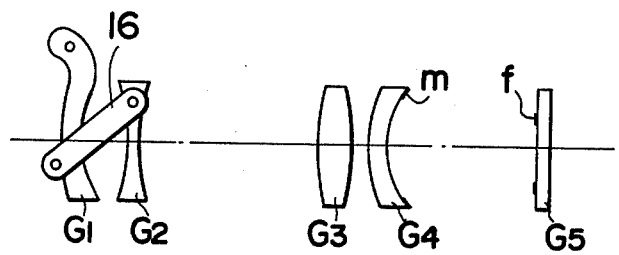
FIG. 7 is a view similar to FIG. 1 of a second embodiment of the present invention.
Figure 8:
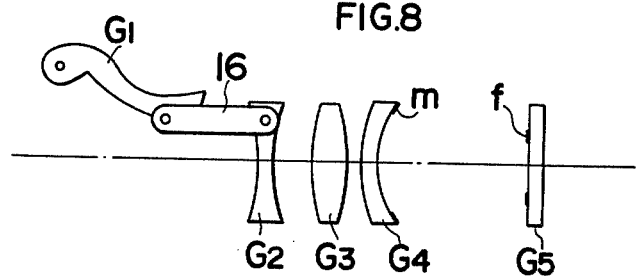
FIG. 8 is a view similar to FIG. 7, but in a high magnification condition.

FIGS. 7 and 8 illustrate a viewfinder optical system in accordance with a second embodiment of the present invention, in which the viewfinder optical system is transferred to the high magnification second condition by the lens G2 being moved rearwardly and causing the lens G1 to be retracted out of the viewfinder optical path. That is, in the low magnification first condition, all the lenses G1, G2, G3 and G4 in the viewfinder are used to form a 4 group 4 element optical system, and in the high magnification second condition lens G2 is moved rearwardly, causing lens G1 to be retracted out of the viewfinder optical path, the viewfinder thus becoming a 3 group 3 element optical system comprising lenses G2, G3 and G4.

Figure 9:
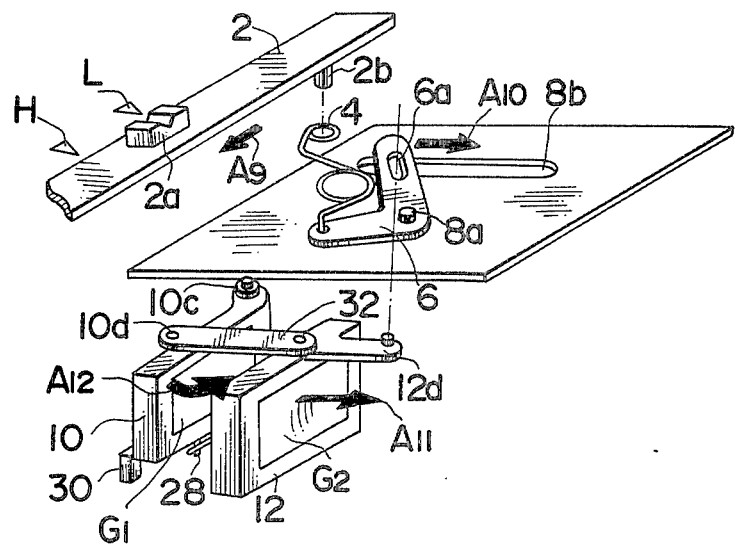
FIG. 9 is a view similar to FIG. 3 of the second embodiment of the present invention.
Figure 10:
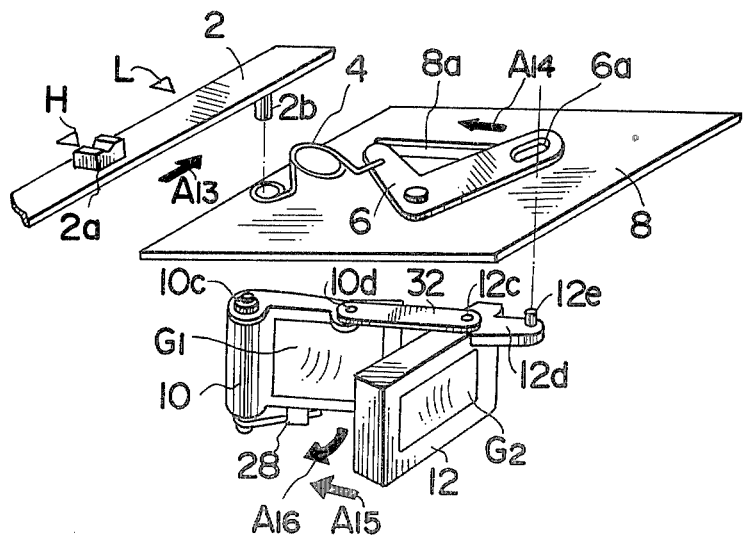
FIG. 10 is a view similar to FIG. 9, but in a high magnification condition.

FIG. 9 illustrates the transfer mechanism with the positions of lenses G1 and G2 in the low magnification first condition. Frame 10 of lens G1 is swingably mounted on pivot 10c which is out of the viewfinder optical path and vertical to the viewfinder optical axis, and is urged by a spring 28 in a clockwise direction. When lens G1 is located within the viewfinder optical path, frame 10 engages a stop pin 30 so that frame 10 is maintained in a plane perpendicular to the viewfinder optical axis. A pin 10d projects upwardly from frame 10 at a position spaced from pivot 10c on the top surface of frame 10 of lens G1, and pin 10d and a pin 12c projecting upwardly from frame 12 of lens G2 are rotatably coupled to opposite ends of a link 32. Projecting rearwardly towards eyepiece G5 from frame 12 of lens G2 is a tongue 12d, at the end of which a pin 12e projects upwardly. Pin 12e slidably engages a slot 6a in an arm of lens changeover lever 6 and also slidably engages slot 8a in fixed plate 8. Lenses G1 and G2 are both formed of synthetic resin material integrally with the respective frames 10 and 12 and the associated pins and pivots. The transfer mechanism comprising operating plate 2, torsion spring 4 and lens changeover lever 6 is identical to that in the first described embodiment of the present invention shown in FIGS. 3 and 4. When operating knob 2a is shifted from index L to index H in the direction of the arrow A9, lens changeover lever 6 is rotated by torsion spring 4 in the direction of the arrow A10, and frame 12 of lens G2 is moved rearwardly in the direction of the arrow A11 while drawing the link 32. Frame 10 of lens G1 is drawn by link 32 to rotate about pivot 10c in the direction of the arrow A12 against the influence of a bias spring 28, frame 10 of lens G1 thus being withdrawn from the viewfinder optical path and positioned as shown in FIG. 10, whereby the viewfinder optical system is changed to the high magnification second condition. When transferring the viewfinder optical system from the high magnification second condition to the low magnification first condition knob 2a is moved from index H to index L in the direction of the arrow A13, as shown in FIG. 10, thus causing lens changeover lever 6 to be rotated by torsion spring 4 in the direction of the arrow A14, whereby frame 12 of lens G2 is moved forwardly in the direction of the arrow A15. Lens G1 is released from its withdrawn inoperative position by link 32, and is rotated under the influence of spring 28 in the clockwise direction of the arrow A16 into registry with the viewfinder optical path. Frame 10 of lens G1 engages stop pin 30, whereby to be maintained vertically in a plane perpendicular to the viewfinder optical axis. In this manner, the viewfinder optical system is transferred from the high magnification second condition to the low magnification first condition.

In the above embodiment, lenses G1 and G2, their frames and pins can be integrally molded of plastics, and the parts can be minimized in number, resulting in a simple construction and assembly.

Although two types of embodiments according to the present invention have been described above, it should of course be understood the present invention is not limited to these embodiments. For example, a structure for indicating the limiting frame need not be based on the albada finder system, but on the so called bright frame type or marked type system in which a half mirror is used to project an image of the limiting frame from the side of the viewfinder optical path may be employed to bring an image of the limiting frame towards an eyepiece. It is further obvious that the number of lenses and their combination for the part or function of lenses G3 through G5 may be selected according to the design purpose.

According to the present invention, as described above, at least two concave lenses are used as an objective in the low magnification first condition, thus permitting the individual lenses to have small surface curvatures, resulting in small aberrations. In addition, since the transfer or change in magnification is made by the rotation of one of the two concave lenses and displacement of the other lens in the direction of the viewfinder optical axis, the changeover mechanism can be of great simplicity, as is clear from the above described embodiments.

We claim:
1. In a camera, a viewfinder having an optical axis and comprising at least one positive lens located on said optical axis, a pair of first and second negative lenses and transfer means for transferring said negative lenses alternatively to a first condition with said first and second negative lenses registering with said optical axis at predetermined respective first positions thereon and a second condition with said first negative lens in a second position out of registry with said optical axis and said second negative lens in a second position axially displaced from its respective first position, said first negative lens being supported for swinging between its first and second positions and said second negative lens being axially movable and said transfer means including means for moving a predetermined one of said negative lenses between its first and second positions and means directly intercoupling said first and second negative lenses to effect the driving of the other of said negative lenses between its first and second positions by the movement of said predetermined negative lens.

2. The viewfinder of claim 1 wherein said negative lenses are forward of said positive lens to define an inverted Galilean lens system and said first negative lens first position is forward of said second negative lens and said second negative lens second position is rearward of its first position.

3. The viewfinder of Claim 1 wherein said negative lenses are forward of said positive lens and define an inverted Galilean lens system therewith and said second negative lens first position is forward of said first negative lens first position and said second negative lens second position is rearward of said first negative lens first position.

4. The viewfinder of claim 1 in a camera including a pair of objective lenses and selector means for alternatively positioning said objective lenses in an operative photographic position in said camera, and further comprising means intercoupling said negative lenses transfer means and said objective lenses alternative positioning means for concurrently operating said transfer and selector means.

5. An inverted Galiliean type viewfinder device for use in a camera and having an optical axis, comprising:
   a convergent lens disposed on said finder optical axis;
   a divergent objective lens group including a first concave lens movable between first and second positions respectively on said finder optical axis, and a second concave lens swingable about an axis perpendicular to said finder optical axis between a first position wherein said second concave lens is positioned on said finder optical axis and within the path of movement of said first concave lens and a second position wherein said second concave lens is positioned out of said finder optical axis;
   means for moving said first concave lens from its said first to its second position; and
   transmitting means including a drive portion provided as a part of said first concave lens and a driven portion provided as a part of said second concave lens, said portions confronting each other when both concave lenses are in their first positions, whereby said second concave lens is moved to said second position by said driven portion being pushed by said drive portion of said first concave lens when said first concave lens is moved from said first to said second position.

6. A viewfinder device as set forth in claim 5, wherein said means for moving said first concave lens includes a stud located on said first concave lens and guided to move along a path parallel with said finder optical axis, a swingable lever having one arm coupled to said stud for moving said stud with the swinging of said lever, a manually operable member movable between a first and a second position, spring means interconnecting said manually operable manner and another arm of said swingable lever, said spring means urging said swingable lever in first direction when said manually operable member is in said first position and urging said swingable lever in an opposite direction to said first direction when said manually operable member is in said second position.

7. A viewfinder device as set forth in claim 5, wherein said device further comprises biasing means for biasing said second concave lens toward its first position, and a stop for limiting the rotation of said second concave lens and maintaining said second concave lens in its first position.

8. An inverted Galiliean type viewfinder device for use in a camera and having an optical axis, comprising:
   a convergent lens disposed on said finder optical axis;
   a divergent objective lens group including a first concave lens swingable about an axis perpendicular to said finder optical axis between a first position wherein said first concave lens is positioned on said finder optical axis and a second position wherein said second concave lens is positioned out of said finder optical axis, and a second concave lens movable from a first to a second position in a predetermined direction along said finder optical axis, said second concave lens being positioned forward of said first concave lens in said predetermined direction;
   means for moving said second concave lens from its said first to its second position; and
   transmitting means including a linkage member intercoupling said first and second concave lenses such that said first concave lens is driven to said second position from said first position by said second concave lens in its movement said first to said second position.

9. A viewfinder device as set forth in claim 8, wherein said means for moving said second concave lens includes a stud located on said second concave lens and being guided to move in a path parallel with said finder optical axis, a swingable lever having a first arm coupled to said stud for moving said stud with the swinging of said lever, a manually operable member movable between a first and a second position, spring means interconnecting said manually operable member and a second arm of said swingable lever, said spring means urging said swingable lever in a first direction when said manually operable member is in said first position and urging said swingable lever in a direction opposite to said first direction when said manually operable member is in said second position.

10. A viewfinder device for use in a camera and having an optical axis, comprising:
   a convergent lens disposed on said finder optical axis;
   a divergent lens group including a first concave lens movable between a first and second position respectively on said finder optical axis, and a second concave lens rotatable about an axis perpendicular to said finder optical axis between a first position wherein said second concave lens is positioned on said finder optical axis and a second position wherein said second concave lens is positioned out of said finder optical axis;
   means for moving one of said concave lenses from its first to its second position; and
   motion transmitting means including a drive portion provided on said one of said concave lenses and a driven portion provided on the other of said concave lenses, said drive portion pushing said driven portion away in response to the movement of said one of said concave lenses, whereby the other of said concave lenses is moved from its said first to its second position.

11. A viewfinder device as set forth in claim 10, wherein said second concave lens, when at its second position is substantially parallel with said finder optical axis.

12. A viewfinder device as set forth in claim 10, wherein said second concave lens when in its first position is in the path of movement of said first concave lens and said moving means moves said first concave lens, and wherein said device further comprises biasing means for biasing said second concave lens toward its first position and a stop for limiting the rotation of said second concave lens and maintaining said second concave lens in its first position.

* * * * *